United States Patent Office 3,391,093
Patented July 2, 1968

3,391,093
POLYESTER-POLYURETHANE FOAMS AND
METHOD OF MAKING SAME
Charles Bedell Frost, Glendora, Calif., assignor to The General Tire & Rubber Company, Akron, Ohio, a corporation of Ohio
No Drawing. Continuation-in-part of application Ser. No. 541,823, Oct. 20, 1955. This application Apr. 1, 1959, Ser. No. 803,380
18 Claims. (Cl. 260—2.5)

ABSTRACT OF THE DISCLOSURE

Rigid to flexible, open or closed cell, polyester-urethane foams can be made by reacting (i) hydroxy terminated polyesters and (ii) polyisocyanates in the presence of a halogen substituted alkane boiling above —60° F. having at least one fluorine atom and being gaseous at a temperature below the temperature reached during solidification of the foam.

This invention relates to making polyester-polyisocyanate foams and particularly relates to a method of making rigid type foamed polyester-urethane by using additives as blowing agents to produce at least a part of the porosity in the foam.

This application is a continuation-in-part of my copending application, Ser. No. 541,823, filed Oct. 20, 1955, and now abandoned.

While the use of polyester-urethane foams has steadily increased in the past, the polyester-urethane foams have been unsatisfactory for insulating materials in refrigerators, aircraft and the like because of their relatively high thermal conductivity, their relatively high moisture transmission rate, their lack of uniform cell size and their tendencies to form thermal pressure cracks and to char when relatively large areas are filled with the formable material and the foamed material is allowed to expand to fill the space.

While as shown in French Patent No. 1,075,964, delivered Apr. 14, 1954, additives, such as acetone, isopropylether, carbon tetrachloride, chloroform and ethyl acetate have been proposed in the past to make more fluid the polyester isocyanate reactants for forming polyester-urethane foams. The addition of these viscosity reducing materials have caused the rigid polyester-urethane foam made with the above additives, to degrade and discolor badly since most of the above additives are relatively active materials and apparently react with the polyester-urethane foams at temperatures around 200° F. to 300° F. to degrade the foam material. Fexible type polyester-urethane foams containing the above viscosity reactants can be prepared and are not usually as degraded during the foaming operation since the exotherm in flexible foams is much lower. However, the use of these flexible foams is limited to a relatively low temperature since, if these foams are heated at even as low as 200° F., they degrade and usually turn brown. In addition to the above disadvantage the foams made with combustible liquids such as ethyl acetate and isopropylether have greatly lowered fire resistance and are difficult to use in making foams safely.

German Patent No. 860,109, shows the use of easily volatilizable substances which do not react with diisocyanate in making polyester-urethane foams. The above German patent discloses the use of acetone, ethyl acetate and methylene chloride in making polyester-urethane foams. Rigid polyester-urethane foams made with the above easily volatilizable substances, namely acetone, ethyl acetate and methylene chloride, shrink, warp badly and turn brown. While flexible polyester-urethane foams can be made using methylene chloride as previously indicated, the resultant foam discolors badly when heated at a temperature as low as 200° F. or 250° F. It is an object of the present invention to provide a polyester-urethane foam which has a relatively low heat conductivity value, a low moisture transmission rate, and yet does not degrade and discolor even though they develop a temperature of 250 or 300° F. during foaming or are heated in use to a temperature of 200 to 300° F. or so.

It is an object to provide an improved rigid polyester-urethane foam having an extremely low coefficient of thermal conductivity, uniform cell structure and good fire resistance.

It is an object to provide a method of making an improved polyester-urethane foam which has a relatively low heat conductivity value and does not degrade and discolor when the temperature during foaming or after foaming reaches 200 to 300° F.

It has been found that improved polyester-urethane foams can be prepared by using a method of producing foamed polyurethane material in which a hydroxy terminated polyester of a polycarboxylic acid and a polyhydric alcohol is reacted with at least a sufficient amount of an organic polyisocyanate to react with the hydroxyl end groups of the polyester in the presence of a halogen substituted alkane having at least one fluorine atom in amounts of about 2 to 25% by weight based on the weight of the polyester. The temperature is permitted to rise during the ensuing reaction while maintaining a pressure during the reaction of not substantially higher than atmospheric so as to produce an improved porous polyester-urethane foam. The fluorine substituted alkane can be added to the polyester, polyisocyanate, or to mixtures of these materials prior to reaction, or to a mixture of the polyester and the activator and the like where used. The substituted alkane also may be added to the reaction mixture itself provided that complete reaction has not taken place. The substituted alkane may be added to a prepolymer of a chain extended polyisocyanate polyester which may contain some isocyanate and/or hydroxyl groups and which may be reacted further with more polyisocyanate and/or polyol to obtain the desired type of urethane.

It is important that the alkane gas have at least one fluorine atom. Apparently the presence of even one fluorine substituent on the methane, ethane, propane, or butane, isobutane, hexane and the like nucleus provides the fluorine substituted alkane and the resultant polyester foamed materials with heat stability so that the foam does not turn brown and discolor when heated to 250 to 350° F. As previously indicated foams made only with $CCl_4$, $CHCl_3$ having no fluorine atoms brown and discolor badly when heated to a temperature of 250 to 300° F. Furthermore, alkanes such as pentane are not successfully retained in the polyester type polyurethane foam structure. Apparently due to their volatility they escape and do not effectively expand the foam. Halogen substituted methanes and ethanes such as $CCl_3F$, $CCl_2F_2$, $CHCl_2F$, $C_2H_2Cl_2F_2$, $C_2ClF_5$, and $C_2Cl_2F_4$, are preferred blowing agents according to the present invention. Suitable fluorine-containing alkanes are, in addition to the above preferred blowing agents, octaflurocyclobutane, $C_4F_8H_2$, hexafluoropropane $C_3F_6H_2$, etc. Apparently the fluorine atom in the alkane renders the alkane stable even at temperatures of 290° to 300° F. which are often reached during the foaming of certain polyester-urethane rigid foams. While the exothermic temperature in the case of flexible polyester-urethane foams generally reaches a temperature of only about 160 to 170° F. maximum, apparently the fluorine atom in the halo- and fluoro-substituted alkane prevents the flexible foam from degrading badly if they happen to be heated at a temperature of 250° F. or more as might occur during sterilization in hospital routines and the like. As hereinafter described in more detail, as low as 2% of the fluorine-containing halogenated alkane gas provides resultant polyester-urethane foams with excellent insulation properties. In addition, such foams have excellent stability at high temperatures which as previously indicated in the case of rigid foams the temperature during foaming may reach as high as 290 to 300° F. As also hereinafter pointed out amounts of fluoro substituted halo alkanes as high as 25% by weight of the polyester can be used to provide both rigid and flexible type polyester-urethane foam. The preferred amount of fluorine-containing halogenated alkane blowing agent is about 5 to 10% by weight, again based on the weight of the polyester starting material. When 5 to 10% by weight of the fluorine-containing liquefied gases are used, the optimum balance of heat conductivity, low moisture transmission, strength and rigidity or resiliency are attained in the polyester-urethane foams.

Outstanding rigid foams having a relatively low thermal conductivity, low moisture transmission rates, and little or no tendency to turn brown and discolor even when heated to 200 to 300° F. can be prepared using cross-linking type polyesters, or even linear polyesters having a relatively low molecular weight, say about 250 or 300 or more. Benefits of the present invention are also obtained when semi-rigid or flexible foams are made according to the present invention. The resultant flexible foams are soft, have load-deflection curves closely resembling those of highly desired natural rubber latex foams and in addition to the above favorable properties, the foamed products had excellent stability when heated to 200° or up to 400° F.

In regard to flexible type polyester-urethane foams as pointed out in the aforementioned parent application, Ser. No. 541,823, in the past polyester-polyisocyanate foams have been made by reacting an nonlinear slightly branched polyester with a diisocyanate or by reacting a linear polyester with a mixture of di- and tri-isocyanates. An excess of diisocyanate over that needed to react with the polyester to form the polyurethane was used to produce a small amount of carbon dioxide for forming the cells or pores in the solid product. A small amount of water was generally present to cooperate with the isocyanate in forming the carbon dioxide.

The diisocyanate was added both to build up the polyester to a high molecular weight in order to cross-link the polyester sufficiently and to provide the excess $CO_2$. Linear polymers alone would not change from the liquid state to the solid state quickly enough to trap any gases evolved, thereby enabling a foamed product to be formed. The cross-linking was necessary to trap and hold gases in order to obtain a low density, cellular foamed polyurethane product.

The principle followed, therefore, was to add sufficient quantity of the diisocyanates to the polyester so that there was enough not only to build up the polyester and cross-link it, but also to enable sufficient carbon dioxide to be formed to develop porosity in the material.

In the ordinary method of making cellular polyurethane or foamed polyester diisocyanate reaction products, a viscous, liquid polyester is pumped at a controlled rate through a nozzle. Polyisocyanate, preferably a diisocyanate having two and only two isocyanate groups, is pumped, but at extremely high pressure to the nozzle, where it contacts the stream of polyester and is thoroughly mixed therewith because of its high velocity. A small amount of water is also introduced into the nozzle either as a stream or in admixture with the polyester. A suitable cross-linking agent or catalyst, such as 1,3-propylene glycol or certain tertiary amines, is also preferably mixed with the polyester or introduced into the nozzle. A stirrer is also generally present in the nozzle to insure homogeneous mixing. From the nozzle, the material is incorporated into a suitable mold, such as an open pan, which is moved in a continuous manner relative to the nozzle to provide the desired layer of viscous reactants on the bottom of the pan or mold.

The bottom of the pan may contain upright cylindrical wooden pegs or cores so that the bottom surface of the polyurethane foam is formed with cored openings such as round cylindrical-shaped voids. These holes not only save material but allow the solid portion of the polyurethane foam to be of a higher density for a given load-deflection characteristic.

Polymerization starts as the materials are mixed and the semi-fluid mass is discharged to large pans. The material mixing is very important. It is essential that the diisocyanate and catalyst be almost immediately and completely dispersed in the polyester. The rate of polymerization is relatively fast and the mass is shaped by the contour of the pans. Carbon dioxide is evolved in the gaseous state from the time of mixing so that the bubbling and frothing occurs during the mixing, discharging and shaping stages.

The time and places at which release of the gas by the isocyanate occurs cannot be controlled, as it is evolved as a result of the reaction between the diisocyanate and water. One of the disadvantages of this uncontrollable release is the formation of a solid crust on the top surface of the polyurethane foam because of loss of $CO_2$ from the surface before the polyurethane is strong enough to hold it as bubbles to provide cellular foam which is substantially solid nonporous polyurethane. Not only must that crust be cut off before further use with great waste, although polyester liquid for reuse can be recovered from the crust by a high temperature steam treatment, but also the surfaces next to any pegs also are solid and undesirable.

Attempts to mix carbon dioxide gas with the polyester and use less expensive isocyanate have been unsuccessful because the strength of the film when the gas pressure is reduced to atmospheric has been insufficient to maintain cellular form and the carbon dioxide is neither sufficiently easily liquefiable nor sufficiently soluble in the reactants to be evolved only gradually.

While the method formerly used is effective, there are serious limitations to producing foamed polyurethanes in this manner. The diisocyanate is very expensive; the very substantial excess used to react with water to evolve carbon dioxide in the gaseous state represents an economic limitation. Another drawback is the formation of the substituted urea by-product of the water-diisocyanate reaction. This by-product is reactive and enters, to some extent, into cross-linking reactions which produce undesirable stiffness in the flexible-type foam products. Also the product, when used in a cored mold, foams with regions of high density in contact with the core member with the result that benefits of cored molds are lost. A further drawback is that maximum viscosity of the polyester is limited because of mixing and therefore very high molecular weight polyesters cannot be used.

As described in the aforemended parent application, an easily liquefied fluorine-containing alkane gas inert to isocyanate and polyester, particularly a gas soluble in the polyester in the liquid state, can be used as the gas source to produce an improved foam. The gas in the liquid state can be relatively easily dispersed in the polyester and little or no modification of the usual equipment is necessary, other than suitable means for mixing the liquefied gas into the polyester used. When the gas is quite soluble in at least one of the reactants and is mixed therein, a pressure drop below that of the gas alone at the temperature occurs and increased fluidity of the reactant, such as the polyester, occurs with resultant permissive use of a higher viscosity reactant. Inasmuch as the liquefied gas is a source of gas for expansion of the polyurethane into a foam, much less expensive diisocyanate is required. Also the water previously introduced for reaction with the diisocyanate is not needed and the amount of substituted urea by-product of the water-diisocyanate reaction is thereby reduced and shrinkage upon set is appreciably less, so that lighter reinforced articles can be made. This is especially desirable when the cellular product is used for foamed-in-place insulation or reinforcement. When using an easily liquefied gas, soluble or readily dispersed in the polyester, I found that the polyurethane foams produced are generally softer than those made in the normal way.

If an easily liquefied gas is used that is both inert to and insoluble in reactants or has a solubility of less than 0.1 mole/g. it should have a boiling point of not less than minus 10° F. (−10° F.) and not above the temperature reached in the early part of the urethane-forming reation, and for flexible foam preferably not appreiably above 80° F. or 90° F. The nonsoluble liquids should be dispersed as fine globules in the polyester or other reactant used and it should be relatively stable. The finely dispersed globules of the liquefied gas will provide for a relatively uniform end-product. When the liquefiable gas is soluble in the polyester it may because of this solubility have a much lower boiling point at atmospheric pressure. The higher the solubility the lower may be the boiling point and liquefiable inert liquids having a solubility of at least 0.25 mole/g. at atmospheric pressure in one of the reactants (preferably polyester or a material of similar chemical composition, such as diethylene glycol acetate) may have a boiling point as low as minus 60° F. (−60° F.) to give good properties. Generally, some of the advantages are obtainable whenever the solubility of the liquefiable gas is in excess of 0.1 mole/g. in the polyester or similar material and boiling point is above minus 60° F. (−60° F.) and not in excess of 50° F.

The heat of reaction breaks the small globules or reduces the solubility of the liquefied gas in the polyester to cause major blowing only after the polyurethane reaction has proceeded far enough to trap the released gas.

A uniform and, therefore, relatively stable dispersion of the gas is desirable, although a liquefied gas that is soluble in the polyester is preferred.

Appreciable solubility of the liquefied gas in the polyester is, I have found, important, as it provides a method of controlling the release of the gas, because release is accelerated by heat of the condensation reaction. For the first time, therefore, it is now possible to improve upon the timing of the concurrent reactions of (1) the network formation, and (2) the gas release that occurs in the normal process so that the stiffening of the polyurethane occurs before the gas is released so that the gas remains trapped even in surface layers.

The type of polyesters to be used depends upon the kind of foamed product desired. A crosslinking type polyester of a molecular weight as high as 5000 or even a linear polyester having a molecular weight of about 250 to 300 or even lower may be used to prepare the outstanding rigid foams of the present invention. In general, cross-linking type polyesters with high molecular weights are used for rigid foam rubber, while more linear polyesters with molecular weights from about 1500 to 2500 are generally used for producing flexible polyurethane rubbers, although because of the solvent effect of the easily liquefiable gas dissolved in the polyester, I may also use higher molecular weights, such as 3000 or 3500 or even somewhat higher. A typical polyester used for the production of flexible foam products is one that is composed of one mol adipic acid and one mol of diethylene glycol with about an additional ⅓₀ mol of trimethylol propane, which is added to provide for cross-linking during the reaction with the diisocyanates. Generally, the linear polyesters for the flexible polyurethane rubbers are of a lower molecular weight than 2500 and are closely controlled, although higher molecular weight polyesters may be used. The viscosity of a typical polyester mentioned above is preferably held between about 1000 and 1100 or 1200 cps. at 73° C. The specific gravity of this polyester is generally about 1.19 at 25° C. and it has an OH number of about 60.

A linear polyester with slightly different characteristics is generally used to produce semi-rigid polyurethanes. The molecular weight of this polyester is also about 1500 to 2500 and has an OH number of about 60. The viscosity however, is only 600 to 800 at about 73° C. and the OH groups are all in the terminal position. The composition of this polyester is one mol of adipic acid and one mol of glycol.

Polyesters used for the manufacture of rigid polyurethane rubbers are generally of the cross-linking type and preferably have molecular weights of 2000 to 3000, although those with molecular weights as high as 4000 or even 5000 may be used. The OH percent is preferably about 7 to 9, the specific gravity is about 1.10 to 1.19 and the viscosity is about 2500 cps. at 73° C. One example of this type of polyester is composed of 2½ mols adipic acid, ½ mol phthalic anhydride, and 4.2 mols of hexane triol. Another example of a polyester of this type would be one composed of 3 mols adipic acid, 2.1 mols hexane triol, and 2.1 mols, 1,4-butane diol.

For rigid polyester-urethane foams having the best all around properties such as uniform cell structure, preferably 85% or more of the cells being closed, and low heat conductivity, branched polyester are used having a molecular weight preferably less than 1000 and more than 500 and having a hydroxyl number of about 220 to 440, acid number of 0 to 40 and a viscosity of about 12,000 cps. (Brookfield) at 25° C. to a viscosity as high as that of D and F on the Gardner Holt scale measured as 60% solids in Cellosolve.

In order to produce a stronger flexible foam, a prereacted liquid reaction product of a linear liquid polyester and some diisocyanate, but insufficient to form a solid product, may be used as the polyester. One example of this type of polyester would be one made from adipic acid and diethylene glycol with an excess glycol and which has a higher OH number (about three times higher) than the typical polyester used for the manufacture of flexible polyurethane foams. This polyester is reacted with a 70:30 mixture of the 2,4- and 2,6-isomers of tolylene diisocyanate until the NCO (isocyanato radical) content is between 8 percent and 10 percent of the reaction product. In other words, one mol of the diisocyanate is added on each end of the polyester. This polymer is still linear and the subsequent reaction with a diisocyanate does not produce an increase in the chain length, except for the mols of the diisocyanate previously added at each end of the polyester.

Examples of some of the suitable diisocyanates are: tolylene diisocyanate, hexamethylene diisocyanate, p,p'-diisocyanato diphenyl methane, naphthalene, 1,5-diisocyanate, metaphenylene diisocyanate, and bitolylene diisocyanate.

The polyisocyanates are preferably used in amounts of about 2 to 3 equivalent weights of polyisocyanate to one equivalent weight of polyester, although from 1.1 to 12 molar equivalent weights of polyisocyanate can be used per mole equivalent weight of polyester to provide useful foams.

The halogen substituted alkane gases having boiling points below about 80° F. to 50° F. and above −60° F. are the gases preferably used although those having somewhat higher or lower boiling points can be used. Of these, the monochlorodifluoromethane is quite outstanding in producing execellent results because of its high solubility in polyester and because it contains at least one fluorine atom. The gases used are normally volatile organic materials that usually exist as a gas at ordinary room temperatures and pressures and exist largely as a liquid at elevated pressures. The alkane gases are saturated aliphatic hydrocarbons which are at least partially fluorinated and may also be chlorinated. Mixtures of these fluorine substituted alkanes can be used.

It is preferred that such gases be used in the amount of 5% to 10% by weight of liquefied gas on the weight of the original polyester, although amounts from 2% to 25% can be used to obtain desirable properties in foamed urethane rubbers. This is especially the case with the monochlorodifluoromethane, which is highly efficient.

The following list contains some of the useful halogen-substituted alkane gases that are useful in accordance with this invention, together with their approximate boiling points at one atmosphere pressure:

TABLE I

| Easily-liquified gas: | Boiling point, °F. |
| --- | --- |
| $CCl_2F_2$ | −21 |
| $CHCl_2F$ | +48 |
| $CHClF_2$ | −41 |
| $C_2Cl_2F_4$ | +38 |
| $CCl_3F$ | +78 |

It is desirable that the liquefied gases be inert to the polyester in order to fit into the existing equipment on commercial foam machines. It is also desirable that the liquefied gases be nonacidic when an alkaline catalyst such as a tertiary amine is present.

A gas such as ammonia, having a boiling point of −28° F. at one atmosphere of pressure, is not useful since it reacts rapidly with the diisocyanate.

In general, the liquified gases should be easy to liquefy and should be of such solubility in the polyester and/or isocyanate and/or catalyst phase that its vapor pressure is greatly reduced and, therefore, capable of handling without expensive high pressure apparatus. However, the gas, as aforesaid, may be relatively insoluble; but, then the gas must be of such a nature that it can be finely dispersed in the liquid polyester or even the liquid isocyanate. Of course the gas, whether dissolved or dispersed, should have a reasonably high vapor pressure at room temperature and preferably boil at least about 50° F., as aforesaid, although when the reactants are not sufficiently cooled to remove the exothermic heat rapidly, beneficial results are also obtained with liquids such as $CCl_3F$, boiling up to 80° F. Foam expansion will therefore occur when the gas is released by a temperature well above its boiling point.

Depending upon the foamed product desired, a blend of soluble and relatively insoluble liquefied gases also may be combined to produce desirable polyurethane foamed rubbers.

The extent of solubility of two useful liquefied gases, namely dichlorodifluoromethane and monochlorodifluoromethane, in three different solvents is shown in Table II.

TABLE II

| Solute | Solubility in Solvent A | | Solubility in Solvent B | | Solubility in Solvent C | |
| --- | --- | --- | --- | --- | --- | --- |
| | Grams/ gram | Moles/ gram | Grams/ gram | Moles/ gram | Grams/ gram | Moles/ gram |
| $CCl_2F_2$ | 0.267 | 0.280 | 0.215 | 0.282 | 0.458 | 0.380 |
| $CHClF_2$ | 1.143 | 0.700 | 1.090 | 0.740 | 1.127 | 0.678 |

In Table II, Solvent A was the ethyl ether of diethylene glycol acetate, which is very similar in chemical properties, such as solubility to polyester, while Solvent B was the dimethyl ether of tetraethylene glycol, and Solvent C was the diethyl ether of diethylene glycol.

The solubilities as shown in Table II were determined at 32.2° C. with a pressure of the halogenated hydrocarbon corresponding to its vapor pressure at 4.5° C. or about 40° F.

As noted in Table II monochlorodifluoromethane is about four times as soluble on a weight basis as dichlorodifluoromethane. Generally, these gases become more soluble at lower temperatures. $CCl_2F_2$ has a vapor pressure of 98.7 p.s.i. absolute at 80° F., while $CHClF_2$ has a vapor pressure of 158 p.s.i. absolute at 80° F.

As demonstrative of my invention, but in no way to limit its scope, I present the following as examples of my invention:

Example 1

Dichlorodifluoromethane, sold by duPont under the name "Freon-12," having a vapor pressure of 84.8 p.s.i. at 70° F., was dispersed as a liquid in the polyester sold as Desmophen-2200. This polyester is the reaction product of about 1 mol adipic acid, 1 mol diethylene glycol, and about 1/30 mol of trimethylol propane, which latter provides for branching and cross-linking during the subsequent reaction with diisocyanate.

The viscosity of the polyester is held between 1000 and 1100 cps. at 73° C.; its moisture content is below 2% and preferably is varied between 0.3 and 0.5%, and it has predominantly hydroxyl end groups.

The polyester is mixed with the liquefied gas in an autoclave equipped for agitation for good dispersion and the mixture containing the dispersed liquefied gas is pumped to the aforementioned nozzle of the foam machine after first warming the polyester to about 22° C. A 70:30 mixture of 2,4- and 2,6-tolylene diisocyanate is also pumped at about 1000 pounds pressure through small orifices to the nozzle to react with the polyester to form the polyurethane. The rate of flow through the nozzle is in accordance with the following recipe:

TABLE III

| Material: | Parts by weight of liquid |
| --- | --- |
| Polyester | 100 |
| Tolylene diisocyanate | 25 |
| Activator | 8 |
| Dichlorodifluoromethane | 5 |

The activator is composed of:

| | Parts |
| --- | --- |
| (a) A catalyst for the polyurethane reaction consisting of the esterification product of 1 mol of adipic acid and 2 mols of diethyl ethanol amine | 3 |
| (b) An emulsifier used for combining the catalyst with water, consisting of a soap of oleic acid and diethyl amine | 2 |
| (c) Water | 1.2 |

Although quantities of dichlorodifluoromethane that are the molar equivalent of the isocyanate $CO_2$ are replaced do not produce quite as much expansion due to the relatively low vapor pressure of the dichlorodifluoromethane, more of the "Freon-12" can be used, since it costs less than one eighth as much as isocyanate $CO_2$ on a molar basis.

The foam produced was very much softer than those made in the normal way. The foam produced displayed very favorable properties in that some of the heavy unblown crust on the top surface of the foamed polyurethane was eliminated. But of most importance, the undesirable formation of a tough, heavy, unblown coating around the core bodies in the bottom surface was also absent. The great waste of unblown product normally obtained by the former methods was thus eliminated.

Example 2

The procedure and materials used are somewhat similar to those described in Example 1, except that the liquefied gas used was difluoromonochloromethane. This is sold under the name of "Freon-22" by duPont. It has a vapor pressure of 135 p.s.i. at 70° F.

The following ingredients, in which parts are by volume of liquid, were used.

TABLE IV

| Material: | Parts by weight of liquid |
| --- | --- |
| Polyester | 100 |
| Tolylene diisocyanate | 35 |
| Activator (hereinafter described) | 8.5 |
| Difluoromonochloromethane | 5 |

The activator is nearly the same as that of Example 1, except that the activator contained two additional ingredients in addition to those mentioned in Example 1. These materials are a paraffin-type oil used for control of the pore size in the expanded polyurethane rubber and a sodium salt of ricinoleic acid used as a water-soluble wetting agent, which permits the use of a lesser quantity of water and causes a delaying of the skin effect of the polyurethane, and allows some of the volatile gases to escape without rupturing the block of the urethane rubber.

The activator formula is as follows:

TABLE V

| Material: | Parts by volume |
|---|---|
| Catalyst (esterification product of 1 mol of adipic acid and 2 mols of diethyl ethanol amine) | 3 |
| Emulsifier (a soap of oleic acid and diethylamine) | 1 |
| Sodium salt of sulfonated ricinoleic acid | 1.5 |
| Paraffin oil for control for pore size | 0.3 |
| Water | 2.0 |

The paraffin oil used for control of pore size is a very high grade mineral oil having a density of 25° C. of about 0.88 to 0.89 gram/cubic centimeter, a viscosity of 25° C. of about 130–150 cps. and an acid number of 0.

The difluoromonochloromethane was added to the polyester with agitation, but the pressure in the polyester tank dropped to less than 10 p.s.i. gauge when the run began, since the difluoromonochloromethane is soluble in the polyester. The complete reaction mixture was discharged from the mixing nozzle as in Example 1, but the foam had not yet started to expand. After discharging the polyurethane began to rise slowly and steadily until a very low foam density of about 0.04 gram per cubic centimeter was obtained.

Again, the objectionable hard brittle crust around the holes in the bottom surface was not present. Also, the foam was softer than that produced in the normal manner.

Example 3

The polyester, the diisocyanate and the activator are the same as in Example 1. This example will illustrate the incorporation of 5 and 10% by weight of liquefied difluoromonochloro-methane into foamed polyurethane recipes. This may be noted below in Table VI and Table VII.

TABLE VI

| Material | Parts by Weight | | |
|---|---|---|---|
| | A | B | C |
| Polyester | 100 | 100 | 100 |
| Tolylene Diisocyanate | 25 | 25 | 25 |
| Activator | 8 | 8 | 8 |
| Difluoromonochloromethane | None | 5 | 10 |

The activator formula in Table VI is the same as in Table III, which is as follows.

| Material: | Parts by weight |
|---|---|
| Catalyst | 3.0 |
| Emulsifier | 2.0 |
| Water | 1.2 |

The resulting polyurethane rubber was similar in improved qualities to Example 2 as may be noted in the Table of Results, Table VII. The density in grams per cubic centimeter of the polyurethane produced with 10% difluoromonochloromethane was approximately one-half of the control standard, which standard is marked as A in the Table of Results, Table VII. The tensile strength and percent elongation were improved as compared to the standard. Again, the solid crust normally found around the bottom holes was not present. Data showing desirable qualities is shown below:

TABLE VII.—TABLE OF RESULTS

| | For Example No. 3 | | |
|---|---|---|---|
| | A | B | C |
| Density (gm./cm.³) | .08 | .06 | .04 |
| Density (lb./ft.³) | 5.0 | 3.7 | 2.5 |

Incorporation of the liquefied gas produced softer foam and, thus, a large drop in compression-deflection tests was observed. Another important result is that a desirable reduction in density is obtained. Thus the foamed rubbery polyurethane obtained has not only substantially equivalent properties of the control standard but is unexpectedly much softer and less dense.

The above examples were intended only to illustrate the invention and not to limit it in any way.

The liquefied alkyl halogenated gases apparently act as solvents in the polyester-isocyanate mixture for other easily liquefiable gases such as the low molecular weight hydrocarbons, $CO_2$, etc. to permit their more effective use. Part of the liquefied alkyl halogenated gases can be substituted by low molecular weight hydrocarbon gases with no more than eight carbon atoms such as methane, ethane, ethylene, propane, propylene, butane, pentane, cyclohexane, benzene, isoctane, isobutylene, butadiene, isoprene and the like. The hydrocarbon gases containing no more than eight carbon atoms that are ordinarily gases or boil at temperatures below 250° F. and preferably below about 150° F. should be dissolved and/or dispersed in the liquefied gases and other ingredients. Preferred gases to use are free of ethylene unsaturation.

Of the amount of liquefied gases and low molecular weight hydrocarbon gases used, the amount of liquefied gases by weight of the gas forming mixture should be at least 50%, although substantial results are obtained when only 25% of the gas forming mixture is present as the liquefied gases.

Inert, inorganic type gases such as $CO_2$ and $N_2O$ may be advantageously mixed and dissolved with the liquefied gases to more effectively utilize the gases in accordance with this invention.

The amount and rate of crosslinking may be controlled also by the use of agents such as tri-isocyanates which have three isocyanate groups to promote cross-linking between the linear polyester or polyether molecular chains. Thus the diisocyanates used in this invention may be substituted in part with triisocyanates particularly when rigid foams are desired such as naphthylene triisocyanate, "Desmodur R," etc. Cross-linking may also be accomplished by using non-linear polyester and polyethers of the cross-linking type.

Suitable cross-linking agents such as tri-methylol propane and polybasic aliphatic or aromatic glycols may be used as well as ingredients such as used in the activator formula in Table V.

The greater the amount of cross-linking, of course, the more rigid the foamed product and thus many types of improved foamed polyurethanes may be prepared according to my invention.

The following example illustrates the preparation of an improved rigid type polyester-urethane foam according to the present invention:

Example 4

A prepolymer was made by reacting 100 parts by weight of a branched type polyester having a molecular weight of about 700 to 800 with 80/20 mixture of 2,4-toluene diisocyanate and 2,6-toluene diisocyanate to form a viscous prepolymer mixture having a viscosity in the range of 5000 to 10,000 centipoises per second (Brookfield) at 25° C. and having an NCO content of 30 to 35%. The branched chain polyester was prepared by mixing about 4 moles of glycerol, 2.5 moles of adipic acids and 0.5 of phthalic anhydride and cooking the ingredients to an acid number of about 1.5, a hydroxyl number of 440, and a viscosity of D to F on the Gardner-Holt scale.

An activator component was prepared for reaction with the above prepolymer by mixing 100 parts of the above described polyester having an OH number of 440 with about 0.4 part of a tertiary amine catalyst (dimethyl ethanol amine) and 0.5 part by weight of a surface active agent (a substantially linear polypropylene ether glycol having a molecular weight of about 1000 and having primary hydroxyl groups—the original polypropylene ether glycol being reacted with ethylene oxide so as to provide the glycol polymer with primary hydroxyl groups in the terminal positions).

In preparing the rigid polyester-urethane foam, the above described prepolymer is cooled to 50–55° F. and 30 parts by weight Freon-11 (CCl$_3$F) is mixed with 100 parts of the cooled prepolymer. The activator mixture is heated to 115° F. for better flow. The activator mixture and prepolymer are then pumped to the mixing head of a commercial foam machine, whereupon a rigid foamed polyester-urethane material is formed. The foam had a very uniform cell structure, 90% of the cells being closed cells. The density of the foam was 2 lbs. per cu. ft. and the K-factor (thermal conductivity value) was about 0.14 B.t.u./sq. ft./hr./in./° F. so that the foam material is an excellent insulating material for refrigerators.

In the above example, other fluorine-containing alkane gases, such as CCl$_2$F$_2$, CHClF$_2$, can be substituted in whole or part for the CCl$_3$F used as the blowing agent to obtain benefits of the present invention.

Furthermore, it is to be understood that in accordance with the provisions of the patent statutes, the particular form of product shown and described and the particular procedure set forth are presented for purposes of explanation and illustration and that various modifications of said product and procedure can be made without departing from my invention.

Having thus described my invention, I claim:

1. In a method of producing foamed polyurethane material wherein a liquid hydroxy terminated polyester of a polycarboxylic acid and a polyhydric alcohol is reacted with at least a sufficient amount of an organic polyisocyanate having 2 to 3 isocyanato groups to react with the hydroxyl end groups of the polyester to form a solid polyurethane foam, the improvement which comprises conducting the reaction between polyisocyanate and polyester prior to solidification to form said foam in the presence of from about 2 to 25 percent by weight based on the weight of the polyester of a halogen-substituted alkane boiling above −60° F., having at least one fluorine atom and being gaseous at a temperature below the temperature reached during solidification of said foam.

2. In a method of producing foamed polyurethane material wherein a liquid hydroxy terminated polyester of a di-carboxylic acid and a di-hydric alcohol and at least a sufficient amount of an organic polyisocyanate having 2 to 3 isocyanato groups to react with the hydroxyl end groups of the polyester are reacted together to first form a liquid then a solid reaction product, the improvement which comprises the steps of incorporating in said liquid reaction product about 2 to 25 percent by weight based on the weight of the polyester of a halogen-substituted alkane boiling above −60° F. having at least one fluorine atom and being gaseous at room temperature at one atmospheric pressure, permitting the temperature to rise during the ensuing reaction above the boiling point of said alkane, and maintaining a pressure on said reaction product during the solidification thereof of not substantially higher than atmospheric to produce a porous polyester-urethane foam.

3. In a method of producing foamed polyurethane material in which a liquid hydroxy terminated polyester of a polycarboxylic acid and a polyhydric alcohol is reacted with at least a sufficient amount of an organic polyisocyanate having 2 to 3 isocyanato groups to react with the hydroxyl end groups of the polyester to form a liquid self-solidifying reaction product, the improvement which comprises the steps of dispersing about 5 to 10 percent by weight based on the weight of the polyester of a halogen-substituted alkane boiling above −60° F. having at least one fluorine atom and being gaseous at around 80° F. at one atmospheric pressure in one of the polyurethane forming ingredients, and permitting the temperature to rise during the ensuing reaction above the boiling point of said alkane at the pressure thereof, the solidification of said liquid reaction product producing a porous polyester-urethane foam.

4. In a method of producing foamed polyurethane material in which one mole of a liquid hydroxy terminated polyester of a polycarboxylic acid and a polyhydric alcohol is reacted with about 2 moles of an organic diisocyanate to form a liquid reaction product which is later solidified by further reaction, the improvement which comprises the steps of dispersing in one of the polyurethane forming ingredients about 2 to 25 percent by weight based on the weight of the polyester of a halogen-substituted alkane having at least one fluorine atom and boiling between about −10° F. and about 80° F., and permitting the temperature to rise during the ensuing solidification reaction above the boiling point of said alkane, at the pressure thereon.

5. In a method of producing foamed polyurethane material in which a liquid hydroxy terminated polyester of a di-carboxylic acid and a di-hydric alcohol having a molecular weight of about 250 to 5000 is reacted with at least a sufficient amount of an organic polyisocyanate having 2 to 3 isocyanato groups to react with the hydroxyl end groups of the polyester to form a liquid reaction product solidifiable to a solid by further reaction, the improvement which comprises the steps of incorporating in said liquid reaction product about 2 to 25 percent by weight based on the weight of the polyester of a halogen-substituted alkane having at least one fluorine atom and boiling at a temperature between −60° F. and the temperature reached during the further reaction of said liquid reaction product, and permitting the temperature to rise during the ensuing reaction above the boiling point of said alkane at the pressure thereon.

6. In a method of producing foamed polyurethane material in which a liquid hydroxy terminated polyester of a dicarboxylic acid and a dihydric alcohol and having a molecular weight of at least 500 is mixed with a sufficient amount of an organic diisocyanate to react with the hydroxyl end groups of the polyester and water also present to form a liquid reaction product solidifiable by further reaction to form a cellular solid polymer, the improvement which comprises the steps of dispersing in said liquid reaction product about 2 to 25% by weight of the polyester of a halogen-substituted alkane having at least one fluorine atom which is gaseous at room temperature and which has a boiling point at one atmospheric pressure not lower than about −60° F. and not substantially higher than +80° F. in said polyester, permitting the temperature to rise during the ensuing reaction above the boiling point of said alkane to form a gas, and maintaining a pressure during the reaction of not substantially greater than atmospheric whereby a porous polyurethane foam is produced, at least in part by expansion of said gas and in part by the carbon dioxide formed by the diisocyanate water reaction.

7. In a method of producing foamed polyurethane material in which a liquid hydroxy terminated polyester, of a dicarboxylic acid and a dihydric alcohol, having a molecular weight of at least 500 is mixed with a sufficient amount of an organic diisocyanate to react with the hydroxyl end groups of the polyester and water also present to form a cellular solid polymer, the improvement which comprises the steps of dispersing and dissolving about 2 to 25% based upon the weight of the polyester of a halogen-substituted alkane having at least one fluorine atom and having a boiling point at one atmospheric pressure not substantially higher than about 80° F. and not lower than about −60° F. in said polyester and, maintaining a pressure during the solidification reaction of not substantially higher than atmospheric to produce a solid porous polyurethane foam after the polyurethane is discharged from the mixing receptacle.

8. In a method of making polyurethane foam by combining (a) a dihydroxy terminated polyester of a dicarboxylic acid and a dihydric alcohol and having a molecular weight of at least 500 (b) an excess amount of an organic diisocyanate over that required to react with the hydroxyl end groups of said polyester and (c) water to form first a liquid reaction product and then by further reaction a cellular solid polyurethane reaction product, the steps of dispersing in said liquid reaction product about 2 to 25 percent based on the weight of said polyester of a liquified fluorine and chlorine substituted alkane boiling above −60° F. and which is inert to glycols, polyesters and isocyanates, to form a mixture, said liquefied alkane being further characterized by consisting of atoms selected from the group consisting of carbon, hydrogen and halogen and having no more than 3 carbon atoms, further reacting said liquid reaction product to form a solid cellular polyurethane material at a temperature substantially higher than the boiling point of said alkane at the pressure of said reaction.

9. In a method of producing foamed polyurethane material in which a liquid hydroxy terminated polyester of a dicarboxylic acid and a dihydric alcohol having a molecular weight of at least 250 is mixed with a sufficient amount of an organic diisocyanate to react with the hydroxyl end groups of the polyester and with water to form a cellular solid polymer, the improvement which comprises the steps of dispersing in said polyester prior to the solidifying reaction thereof about 5 to 10% by weight of the polyester of a liquefied chloro- and fluoro-substituted alkane boiling above −60° F. and below the temperature reached in the foaming reaction and having at least one fluorine atom.

10. In a method of producing foamed polyurethane material in which a liquid dihydroxy terminated polyester of a polycarboxylic acid and a polyhydric alcohol is reacted with an organic polyisocyanate to form first a liquid reaction product and then by further reaction a cellular solid polymer, the improvement which comprises the steps of dispersing as a liquid in the liquid polyester about 5 to 10% by weight of the polyester of a halogen-substituted alkane boiling above 60° F. at a temperature below the temperature reached during solidification of said liquid polymer, said alkane having at least one fluorine atom and at least one chlorine atom, said alkane being nonacidic and inert to said polyester compound and being soluble in said polyester in an amount of less than 0.1 mols/g., and mixing and reacting said polyester having said liquefied halogen-substituted gas therein with an organic polyisocyanate having an aromatic group to produce an expanded polyurethane foam, the ratio of weight of said polyisocyanate to said polyester being at least about a one-to-one molar ratio.

11. A method of producing a polyurethane foam which comprises mixing:
(1) an organic polyisocyanate;
(2) a polyester resin which is the reaction product of a dihydric alcohol and a dicarboxylic acid;
(3) water; and
(4) a chlorofluoro-alkane; said alkane being volatilized during the foaming reaction between components (1), (2) and (3).

12. A method of producing a polyurethane foam which comprises mixing:
(1) an organic polyisocyanate;
(2) a polyester which is a reaction product of components comprising a dihydric alcohol and a dicarboxylic acid;
(3) water; and
(4) a chlorofluoro-alkane; said alkane being volatilized during the foaming reaction between components (1), (2) and (3).

13. A polycarboxylic acid-polyhydric alcohol-polyester/organic polyisocyanate urethane foam, said foam comprising closed cells containing trapped therein a halogenated alkane possessing at least one substituted fluorine atom and possessing a boiling point between −60° F. and the temperature reached during the formation of said foam.

14. A polyester-urethane foam according to claim 13 in which said alkane has the formula $CCl_2F_2$.

15. A polyester-urethane foam according to claim 13 in which said alkane has the formula $CHClF_2$.

16. A polyester-urethane foam according to claim 13 in which said alkane has the formula $CCl_3F$.

17. A polyester-urethane foam according to claim 13 in which said alkane has the formula $C_2Cl_2F_4$.

18. A urethane foam, as claimed in claim 13, wherein said closed cells contain a mixture of gases comprising (1) at least 50 percent by weight of an alkane boiling above −60° F. and below +80° F. and containing at least one substituted fluorine atom and (2) the balance being substantially a hydrocarbon gas free of ethylenic unsaturation, boiling at a temperature below about 150° F. and having not in excess of eight carbon atoms.

References Cited
UNITED STATES PATENTS
| | | | |
|---|---|---|---|
| 2,848,428 | 8/1958 | Rubens | 260—2.5 |
| 2,764,565 | 9/1956 | Hoppe et al. | |

FOREIGN PATENTS
| | | |
|---|---|---|
| 519,547 | 5/1953 | Belgium. |
| 860,109 | 12/1952 | Germany. |

DONALD E. CZAJA, *Primary Examiner.*

L. J. BERCOVITZ, D. ARNOLD, *Examiners.*

F. McKELVEY, *Assistant Examiner.*